Feb. 15, 1955  A. A. MILLER  2,701,974
CHANGE SPEED GEARING

Filed Feb. 8, 1950  4 Sheets-Sheet 1

Inventor
ALBERT ARTHUR MILLER
By [signature]
Attorney

Feb. 15, 1955    A. A. MILLER    2,701,974
CHANGE SPEED GEARING
Filed Feb. 8, 1950    4 Sheets-Sheet 2

Inventor
ALBERT ARTHUR MILLER
By [signature]
Attorney

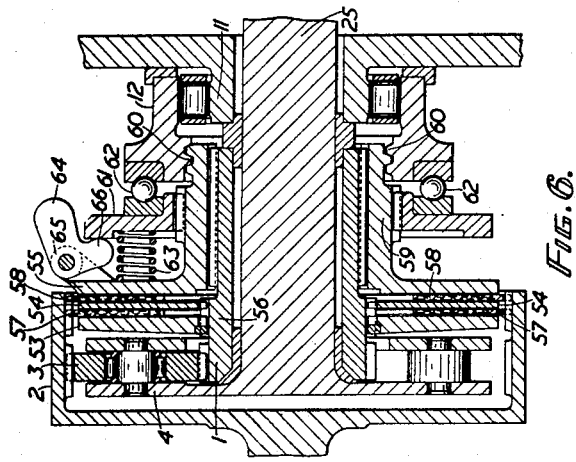
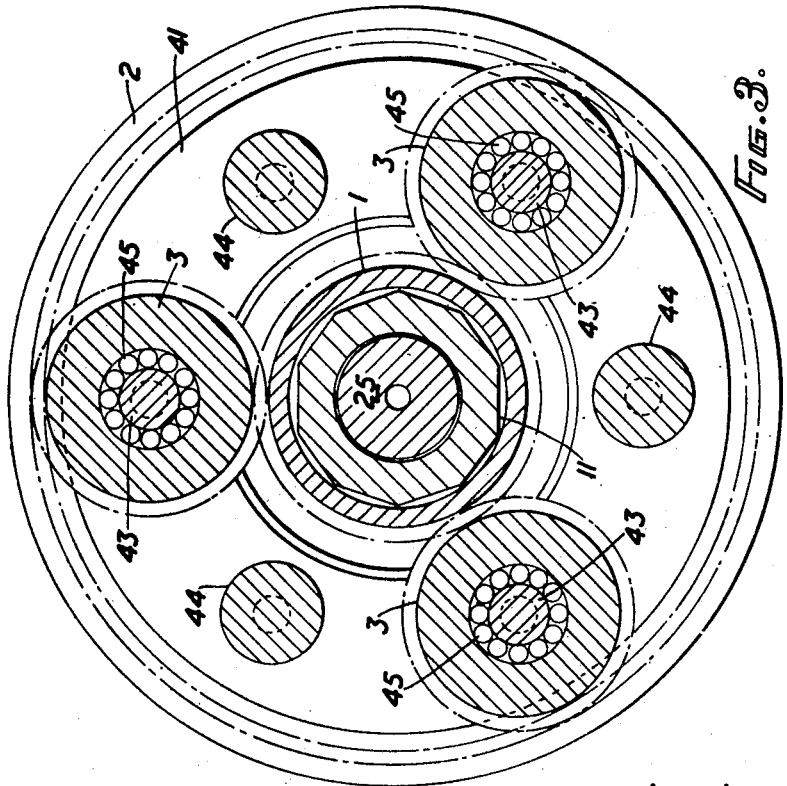

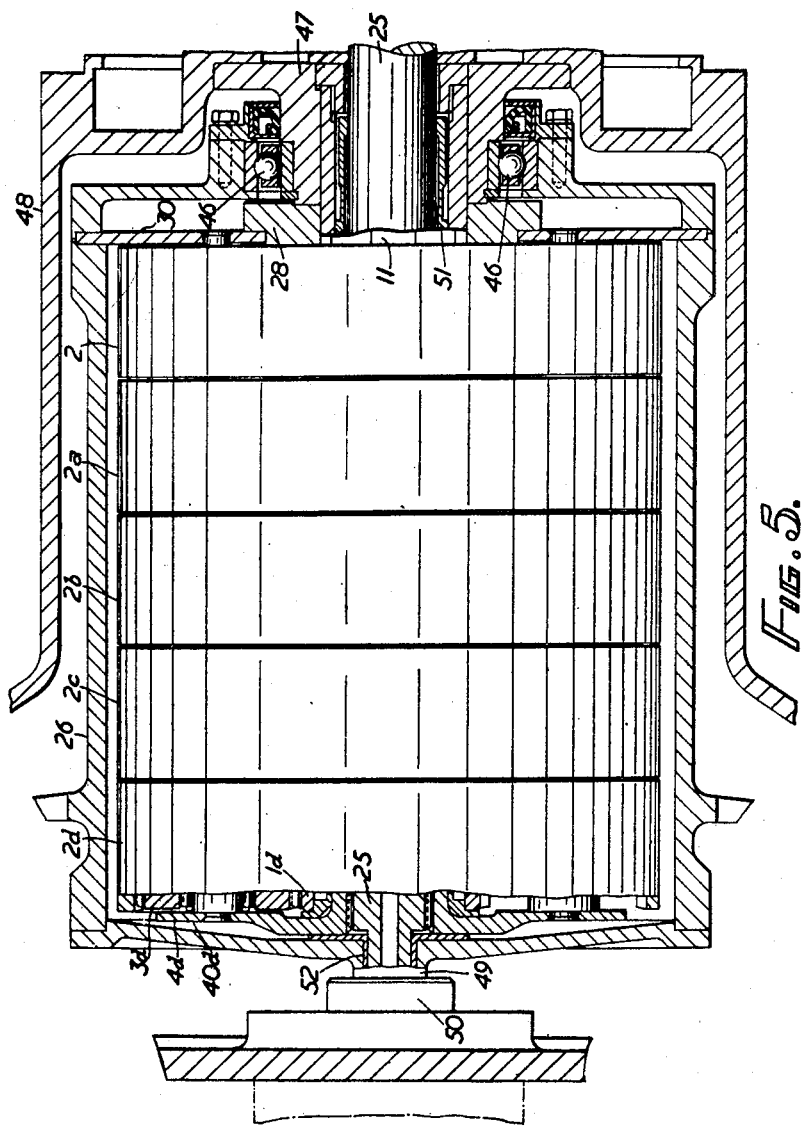

ent Office 2,701,974
Patented Feb. 15, 1955

2,701,974

CHANGE SPEED GEARING

Albert A. Miller, Esher, England, assignor to M. and W. Patents Limited, Coventry, England, a British company Application February 8, 1950, Serial No. 142,963

Claims priority, application Great Britain February 10, 1949

3 Claims. (Cl. 74—751)

This invention relates to change speed gearing, and is particularly, but not exclusively, applicable to change speed gearing for motor road and rail vehicles.

The object of the invention is the provision of improved change speed gearing. The invention consists broadly of an automatic change speed gearing, wherein the change from a lower to a higher speed transmission ratio takes place upon the transmitted torque falling below a given predetermined value, and the change from said higher to said lower speed transmission ratio, takes place when the transmitted torque exceeds a given variable value which is greater than said predetermined value by an amount which is greater or less according as the speed is greater or less.

In order that the invention may be the more clearly understood a change speed gearing in accordance therewith will now be described, reference being made to the accompanying drawings wherein:

Figure 3 is a cross section of the same, taken on line III—III of Figure 1;

Figure 5 is an elevation shown partly in section of the whole gearing made up of a series of the units illustrated in the preceding figures;

Figure 6 is a sectional elevation of a modified form of unit.

Figure 1:
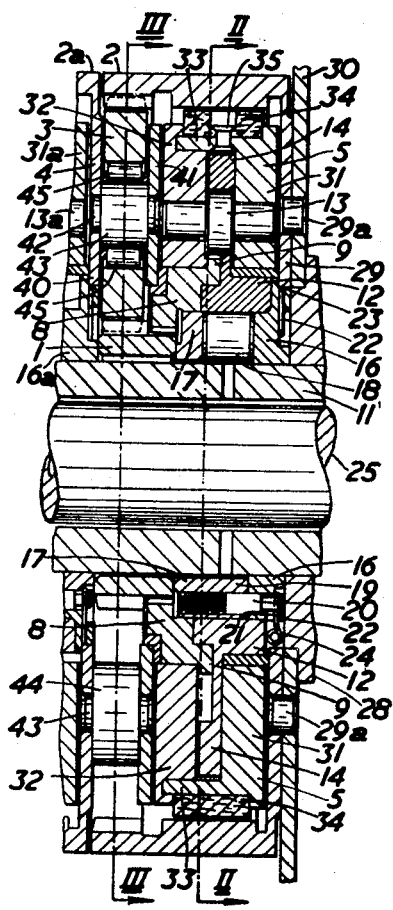
Figure 1 is a sectional elevation of one unit of the gearing, the section being taken on line I—I of Figure 2.
Figure 4:
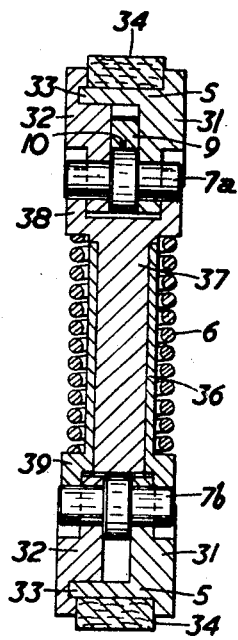
Figure 4 is a scrap section taken on line IV—IV of Figure 2.

Referring first to Figures 1 to 4 the unit therein illustrated comprises an epicyclic gearing consisting of a sun wheel 1, a drum 2 provided with internal teeth, and three planet wheels 3 in mesh both with the sun wheel and the teeth of the drum, said planet wheels being spaced at equal angular intervals about said sun wheel. The planet wheels 3 are mounted on a planet carrier 4. The input to the unit is to the drum 2 and the output is from the planet carrier 4. When the epicyclic gearing is acting as such, the sun wheel 1 acts as the reaction member. Thus a ratchet mechanism is provided which acts, as will hereinafter appear, to prevent backward rotation of the sun wheel 1, i. e. rotation in a direction opposite to the rotation of the drum 2, but which freely permits forward rotation of said sun wheel in the same direction as the rotation of the drum. Thus the epicyclic gearing is adapted to transmit power from the drum 2 to the planet carrier 4 at a speed reducing ratio, the sun wheel 1 being urged backwards but being held stationary by the action of the ratchet mechanism.

In addition a clutch is provided, comprising an inner element consisting of a pair of friction shoes 5 and an outer element which is constituted by the drum 2 itself. The friction shoes 5, as will be hereinafter described, are coupled to the sun wheel 1 for rotation therewith and are outwardly biased by means of springs 6 towards the position at which they frictionally engage the drum 2. Also, when said friction shoes are rotating they are subjected to centrifugal force tending to force them outwards into engagement with the drum. On the other hand said friction shoes, as will be hereinafter described, are drawn inwardly by a force which is proportional to the backward torque exerted by the sun wheel 1 on the ratchet mechanism.

In operation therefore, when the gearing is stationary under conditions of no load the only force acting on the friction shoes 5 will be that exerted by the springs 6, and said friction shoes will accordingly be engaged with the drum. This spring force is light, and when it is not augmented the drum can slip relative to the friction shoes when the applied input torque exceeds a predetermined value within the capacity of the prime mover. When therefore the prime mover is first coupled to the drum 2, the friction shoes 5 will be engaged with the drum and will tend to transmit a solid or en bloc drive to the planet carrier 4, the epicyclic gearing being locked, but if the torque exerted by the prime mover exceeds the said predetermined value, the drum 2 will commence to slip relative to the friction shoes, and transmission will begin to be effected as above described to the planet carrier, with the epicyclic gearing acting as such and the sun wheel acting as reaction member. Backward torque will therefore be exerted by the sun wheel 1 on the ratchet mechanism, and the friction shoes 5 will accordingly be drawn inwardly out of engagement with the drum in opposition to the springs 6. Thus there is only a momentary slippage between the drum and the friction shoes, after which the friction shoes are fully disengaged from the drum and the unit transmits at the reduced speed ratio.

At this stage the friction shoes 5 are subjected only to the engaging force exerted by the springs 6 and the disengaging force executed by the sun wheel torque, which latter is of course proportional to the transmitted torque. When this torque falls to a given amount the springs 6 will prevail and the friction shoes 5 will engage the drum, and, the transmitted torque being light, said friction shoes will be rotated forwardly by the drum, the sun wheel 1 being rotated forwardly with said friction shoes, this being permitted by the ratchet mechanism.

This of course will produce a solid or en bloc drive, the drum 2, the sun wheel 1 and the planet-wheels 3 and their carrier 4 all rotating as one piece, and immediately this begins to happen, centrifugal force will be added to the force exerted by the springs 6 and the friction shoes 5 will be held firmly in engagement with the drum.

The force exerted by the springs 6 being constant, the retention of the solid drive will depend on the relation between the transmitted torque and the centrifugal force tending to retain the friction shoes 5 in engagement with the drum 2, or, in other words, on the relation between the transmitted torque and the speed of rotation. When the transmitted torque is too high for a given speed, the drum 2 will commence to slip relative to the friction shoes 5, and immediately this occurs, the consequent slowing up of the rotation of said friction shoes causes a reduction in the said centrifugal force so that the clutch slips still more, and in a very short time the transmission will be effected at the reduced speed ratio with epicyclic gearing acting as such and the sun wheel stationary and acting as reaction member, and the friction shoes accordingly also stationary. Immediately this occurs the torque reaction exerted by the sun wheel 1 on the ratchet mechanism operates to pull the friction shoes 5, in opposition to the springs 6, fully out of engagement with the drum 2. The unit is therefore now transmitting at the reduced speed ratio as before, with the clutch fully disengaged.

It will thus be seen that the change from solid drive to reduced speed ratio depends on the relation between the transmitted torque and the speed of rotation, the higher the speed the greater the torque which can be transmitted without a change down. It will also be observed that, the instant the torque becomes too high for the speed, and the drum commences to slip relative to the friction shoes, the condition becomes unstable and the change down is effected very rapidly.

On the other hand the change up from reduced speed ratio to solid drive depends solely on the transmitted torque. When this falls below a given constant value, the friction shoes 5 engage the drum 2, and solid drive commences. Here again the change takes place progressively under conditions of instability, because the moment the friction shoes commence to rotate, centrifugal force is added to the force exerted by the springs 6 to keep the clutch engaged. In practice if the engine torque is gradually reduced there comes a point at which the springs 6 cause the stationary friction shoes to rub on the rotating drum, but an appreciable further lessening of the sun wheel reaction is necessary before sufficient friction is produced to rotate the sun wheel forwards against the remaining reaction, and until this condition is overcome no centrifugal assistance is obtainable, and a continuance of the condition would tend to overheat the clutch. The fact is however, that whenever any friction occurs between the shoes and the drum, a corresponding amount of torque is lost to the driving member and so there is immediately a corresponding reduction in the torque reaction transmitted from the sun wheel to the ratchet mechanism with a consequential increment in the force applied to engage the clutch. The cam slots 15 are so positioned and inclined that this increment is sufficient to make the action progressive. After the change up is effected the transmitted torque will have to rise to a considerably higher value in order to effect the change down.

Describing now the unit in further detail, the clutch shoes 5 are diametrically opposite and each extend throughout an arc of say a third of a circle. Each clutch shoe 5 carries a pair of transverse pins or roller 7a and 7b at its two ends. The springs 6 are coil springs located in the gaps between the ends of the shoes and each in compression between the pins 7a, 7b at the shoe ends between which it is located. Thus the shoes 5 are biased outwardly against the drum.

The sun wheel 1 is keyed fast to a hub 8 which carries two diametrically opposite outwardly extending lugs 9 which have diametrically opposite holes 10 in which the diametrically opposite pins 7a respectively pivot. The ratchet mechanism, which will be described in detail later, comprises a fixed inner element 11, an outer element 12 and a self-locking roller clutch between the inner element and the outer element which permits the outer element to rotate forwardly but not backwardly. Each clutch shoe 5 carries also, at a point intermediate of its length, a third transverse pin or roller 13, and the outer ratchet element 12 is formed with two diametrically opposite lugs 14 in which are diametrically opposite slots 15 through which the pins 13 respectively pass. Thus, as soon as the sun wheel 1, upon slippage of the drum 2 relative to the clutch shoes 5, commences to act as reaction member to the epicyclic gearing, said sun wheel will make a slight rearward rotary movement and will act through the pins 7 to pull the two clutch shoes 5 slightly rearwardly with it. The outer element 12 of the ratchet mechanism together with its lugs 14 cannot make any rearward movement and therefore any slight rearward movement of the sun wheel 1 and clutch shoes 5 will cause the pins 13 of said clutch shoes to move rearwardly in the slots 15 in said lugs 14. The inclination of said slots 15 is such that this causes said pins 13, and therefore the clutch shoes 5 themselves, to be pulled inwardly. In other words a backward torque exerted by the sun wheel and clutch shoes tends to hold said clutch shoes inwardly out of engagement with the drum 2. Thus the condition heretofore described is attained.

On the other hand when the torque becomes too low the springs 6 will move the clutch shoes 5 outwardly, and this, owing to the inclination of the slots 15 will cause the clutch shoes and sun wheel to rotate slightly forwards relative to the lugs 14 and outer ratchet element 12. When said clutch shoes 5 engage the drum, solid drive is effected, said clutch shoes, the sun wheel and the outer ratchet element all rotating as one piece, and the outer ratchet element overrunning the fixed inner ratchet element.

It will be seen that the holes 10 in the flanges 9 do not make a perfect fit with the pins 7a but are slightly elongated, the elongation being in such a direction as to permit a slight backward movement of the sun wheel 1 and flanges 9 relative to the brake shoes 5, and to cause, by virtue of such slight backward movement, a slight inward movement of the brake shoe pins 7a which pass through said holes 10. Thus when the brake shoes 5 are being pulled to the disengaged position by the backward movement of the sun wheel 1, the first small backward movement pulls slightly inwardly the pins 7a and the subsequent backward movement pulls the pins 13 inwardly thereby pulling the brake shoes as a whole radially inwards.

Figure 2:
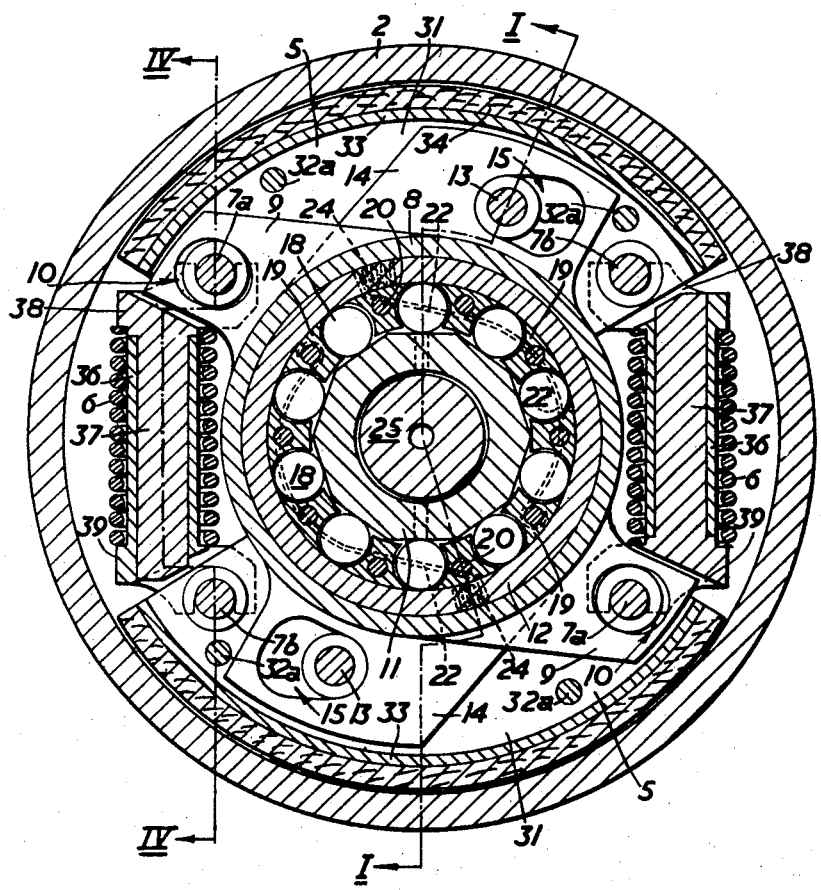
Figure 2 is a cross section of the same, taken on line II—II of Figure 1.

Describing now the ratchet mechanism by which outer element 12 can rotate forwardly but not backwardly relative to the inner element 11, said inner element, as shown in Figure 2 is of polygonal section and is surrounded by two annular elements 16 and 17 spaced axially apart. The element 16 fits closely on the element 11 and is therefore fixed against rotation. The element 17 is clear of said element 11 and is rotatable. Between said elements 16 and 17 is a series of rollers 18 surrounding said element 11, and said element 17 has integral therewith a series of projections 19 which extend longitudinally towards, and abut against the element 16, and are located between said rollers. These projections 19 are shaped, as shown in Figure 2, to locate the rollers 18, and it will be seen that, by virtue of said projections, said rollers are constrained to move with the element 17 round the element 11. Longitudinal pins 20 are screwed into the projections 19 and these pins project into arcuate slots 21 in the element 16. Said arcuate slots 21 are of such a length as to permit of only a limited rotary movement of said element 17 about the element 11. The outer element 12 of the ratchet mechanism surrounds the elements 16 and 17 with its inner periphery closely surrounding the rollers 18, and thus the rollers are completely confined in an annular conduit formed between the elements 11, 16, 17 and 12.

It will be seen that the number of rollers 18 is equal to the number of flats on the surface of the element 11. When the element 17 is towards the limit of its rotation in the forward direction the rollers occupy the position illustrated in Figure 2, that is to say each roller is at the centre of a respective flat on the surface of the element 11. At this position the rollers will be loose between the element 11 and the element 12. When, however, the element 17 is towards the limit of its rotation in the rearward direction, each roller will be near an end of a respective flat on the surface of the element 11, and at that position the rollers will be jammed tightly between the element 11 and the element 12. Said element 17 is spring biased towards the limit of its rotation in the latter direction that is to the jammed position of the rollers, this bias being effected by means of two wires 22 located in a slot 23 in the element 16, each of which is connected at one end to one of the pins 20 and whose other end terminates in a coil spring 24 abutting in compression against a shoulder on said element 16.

The operation will now be clear. Normally the rollers 18 will be held in the jamming position but only lightly so, as the springs 24 are light springs. When a torque in the rearward direction is applied to the element 12, this tends to move the rollers still further in the jamming direction and the rearward movement of the element 12 is accordingly resisted. When a torque in the forward direction is applied to the element 12, this un-jams the rollers and said element rotates freely in the forward direction, maintaining the rollers at the un-jammed state, until said element 12 ceases to rotate whereupon the rollers are returned lightly to the jammed position.

Referring now to Figure 5, this illustrates a complete change speed gear gear, say for a motor road vehicle, consisting of a plurality of units in series all similar to the one which has been described above with reference to Figures 1 to 4. In this complete change speed gear the engine shaft is coupled, by the vehicle clutch, to the drum of the first unit; the planet carrier of said first unit being coupled to the drum of the second unit, and the planet carrier of said second unit being coupled to the drum of the third unit and so one. The units are designed to respond at different torques when changing up, and at different torque-speed characteristics when changing down. Thus, if all the units are at the step-down state, the gear being therefore the lowest possible, and the driver raises his acceleration pedal and thereby reduces the torque, the units will change successively to the solid drive state, until the solid drive condition obtains for the whole mechanism. In like manner, if the vehicle is running at speed with all the units at the solid drive state, and an incline is reached which causes the torque to rise and/or the speed to drop, the units will change successively to the step-down state, until, if the hill is sufficiently long and steep, they will all be at the step-down state and the gear will be the lowest possible.

More particularly the driven member for the whole arrangement consists of a shaft 25 and the driving member consists of a main hollow cylindrical casing 26 which is rotatable about the axis of said shaft. The fixed inner ratchet element 11 is common to all the units and takes the form of a sleeve surrounding said shaft 25. The units are mounted coaxially in line within said main casing 26. The drum 2 of the first unit of the series (which is the unit actually illustrated in Figure 1) is secured fast to said main casing 26. The planet carrier 4 of said first unit is fast to, or integral with, the drum 2a of the second unit (as best seen in Figure 1); the planet cage of the second unit is fast to or integral with the drum 2b of the third unit and so on. The last unit has its planet cage 4d connected fast to the shaft 25.

Describing now, with particular reference to Figure 1, certain of the constructional details of each unit, the reference 28 designates a fixed boss surrounding the element 11. The drum 2 at its right hand end is integral with an inwardly extending annular disc 29 and this is riveted by rivets 29a flush to an annular disc 30 which, at its outer edge is secured to the outer casing 26, and thus said drum is connected to said outer casing.

As before described the element 16 is fixed. The outer element 12 of the ratchet bears on said element 16. The hub 8 bars on said element 12 and the sun wheel 1 is keyed to said hub 8.

Each friction shoe 5 consists of two parts 31 and 32 secured together side by side by means of screws or rivets 32a with a space between them, the part 31 having a spacing tongue 33 which engages in a slot in the part 32. Said friction shoe at its outer periphery has a layer 34 of friction material riveted to it by rivets 35 passing through the tongue 33.

The pins 7a, 7b and 13 pass through the two parts 31 and 32 of each friction shoe 5, each of said pins having an enlarged centre portion which is located in the space between said parts. The lugs 9 and 14 project into said space between said two parts 31 and 32 and the enlarged centre portions of the pins 7a and 13 are located in the respective holes 10 and slot 15.

Each spring 6 embraces a tubular rod 36 in which telescopes an inner rod 37. Said two rods have heads 38 and 39 at their outer ends, and the spring 6 is in compression between said two heads. Each head is bifurcated so as to straddle the friction shoe 5 and the forks on each side of said friction shoe are again bifurcated so as to straddle the ends of the pins 7a and 7b, all as clearly shown in Figures 2 and 4.

Each planet carrier 4 consists of two parallel spaced plates 40 and 41 riveted together by means of rivets 42 and 43, cylindrical spacing enlargements 43 and 44 being formed on said rivets 42 and 43. The planet wheels 3 are rotatably mounted on the spacing elements 43 through the medium of roller bearings 45. Said planet carrier, as shown, rotates on the element 8.

It will be seen that the plate 40 is integral with the drum 2a of the next unit. The references 31a, 13a and 16a designate the parts of said next unit equivalent to the parts 31, 13 and 16.

The plate 40d of the last planet carrier 4d terminates at its inner edge in a boss 46 which is keyed to the output shaft 25.

The outer casing 26, at its right hand end, runs on ball bearings 46 supported on a fixed boss or arbour 47 which is secured to a part 48 of the fixed structure. Said fixed boss or arbour 47 also carries the element 11. At its left hand end the outer casing 26 is formed with a stub axle 49 which runs in a fixed bearing 50.

The shaft 25, at its right hand end, runs in a bearing 51 mounted in the hollow interior of the element 11, and at its left hand end said shaft 25 runs in a bearing 52 in the hollow interior of the stub axle 49.

Referring now to Figure 6 this illustrates a gear change unit which has, instead of a radially operating shoe clutch, an axially operating plate clutch. This plate clutch comprises a set of disc-shaped clutch plates 53, 54, 55 non-rotatably mounted at their inner edges on the outer periphery of a boss 56 extending integrally from the sun wheel 1 (say to the right), and a set of disc-shaped clutch plates 57, 58 interleaving said plates 53, 54, 55 and non-rotatably mounted at their outer edges on the inner periphery of the internally toothed drum 2. The end plates 53, 55 of the first set form the end plates of the whole series. The end plate 53 which is nearest to the sun wheel 1 is fast against axial movement to the left, but all the others of both sets are capable of axial movement. The right hand end plate 55 has a sleeve 59 extending axially therefrom to the right. The ratchet mechanism, which has a fixed inner element 11 and an outer element 12 which is free to rotate only in the same direction as the drum 2, is located axially beyond the right hand end of said sleeve 59. The outer ratchet element 12 extends leftwards and its left hand portion surrounds the right hand portion of said sleeve 59, and these two portions interengage at 60 through the medium of a steep-pitch screw thread. Said outer ratchet element 12 is positively prevented from axial movement.

Mounted in splined relation on the outside of the said sleeve 59 is a thrust member 61. An end thrust ball bearing 62 is provided between said thrust member 61 and the left hand end of the outer ratchet element 12, and compression springs 63 (only one of which is seen) are provided between said thrust member 61 and the right hand end plate 55. Finally a number of weighted arms 64 (only one of which is seen) are pivotally mounted on lugs 65 on the outer periphery of said right hand end plate 55, and said weighted arms 64 have tail extensions 66 beyond their pivot whose ends, when said arms are forced outwardly by centrifugal force, is pressed against the left hand face of the thrust member 61 thereby pressing said right hand end plate 55 to the left, and tending to engage the clutch.

As in the preceding embodiment, planet gears 3 are in mesh with teeth on the sun wheel 1 and teeth on the inner periphery of the drum 2, and are mounted on a planet carrier 4 which is fast with the output shaft 25. The input is to the drum 2.

Further details are deemed clear from the drawings.

It will now be seen that this unit operates in substantially the same way as the one illustrated in Figures 1 to 5. When the gearing is stationary, under conditions of no load, the compression springs 63 will keep the clutch lightly at the engaged state. When therefore the prime mover is first coupled to the drum 2 the clutch will be engaged and will tend to transmit a solid drive to the planet carrier 4 and shaft 25, but if the torque exerted by the prime mover exceeds a predetermined value, said clutch will commence to slip, and transmission will begin to be effected at reduced speed ratio to said planet carrier 4 and shaft 25, the transmission being through the epicyclic gearing with the sun wheel 1 acting as reaction member. Backward torque is therefore exerted by the sun wheel and this is transmitted to the sleeve 59, and, since the outer ratchet element 12 is incapable either of rotating backwardly or moving axially, this backward torque on the sun wheel 1, causes a slight actual backward rotation of said sun wheel 1 and sleeve 59, and this, through said steep-pitch thread at 60, causes said sleeve 59 and right hand end plate 55 to move slightly to the right in opposition to the compression springs 63 thereby actuating the clutch to the disengaged position. The clutch is now fully disengaged and the unit transmits at reduced speed ratio.

As before the clutch is now subjected only to the engaging force exerted by the springs 63 and the disengaging force exerted by the transmitted torque, since the weighted arms 64 are not rotating. When the latter force falls to a given amount the springs 63 will prevail, and will move the clutch plate 55 to the left thereby engaging the clutch and commencing solid drive. Immediately thereupon, the weighted arms 64, now in rotation, will be urged outwardly by centrifugal force, and the said tail extensions 66 will press against the left hand face of the thrust member 61, thereby pressing said plate 55 to the left and augmenting the spring force holding the clutch at the engaged position.

It will now be seen that the operation is exactly analogous to that of the embodiment illustrated in Figures 1 to 5, and that the retention of the solid drive will depend on the relation between the speed and the transmitted torque. The same conditions of instability as before, during the change in both directions, will be manifest, only a momentary period of clutch slippage being possible in each case.

It is to be further clearly understood that the invention contemplates the employment of transmission trains other than epicyclic gearing. Obviously, any transmission train of differential character can be employed, having a driving element, a driven element and a reaction element, which is free to rotate in a forward direction but is prevented by a ratchet mechanism or other self-locking clutch from rotating backwardly.

It will be observed that an important feature of the invention is that the spring means, which tend to actuate the clutch to the engaged position, and thereby produce the condition of solid drive, are assisted by a force which is a function of the speed of rotation of the reaction member, while there is a force tending to actuate the clutch to the disengaged position which force depends on the moment of the torque reaction transmitted to the ratchet or self-locking clutch from the reaction member. Thus the change down depends upon the relation between the torque and the speed, whereas the change up depends solely on the torque and not on the speed, since, at the commencement of change up, the reaction member is not rotating and the spring means are therefore not augmented.

I claim:

1. A power transmission mechanism comprising a driving member, a driven member, a gearing connected between said driving member and said driven member for transmitting power from said driving member to said driven member at a step-down speed ratio, a rotatable reaction member appertaining to said gearing, one way brake means comprising an element mounted for unidirectional rotation, a clutch comprising a driving clutch element attached to a member of said gearing and a driven clutch element attached both to said reaction member and to the said element of the one way brake means, whereby said reaction member is restrained against rotating in one direction and is thereby enabled to act as a reaction member, while being free for rotation in the other direction, means permanently biasing said driven clutch element into engagement with said driving clutch element, additional means for biasing said driven clutch element into engagement with said driving clutch element, but only when said driven clutch element is rotating, the bias afforded by said additional means being greater or less according as the speed is greater or less, said driving and driven clutch elements being slippable relative to each other, when in engagement, upon the transmitted torque exceeding a given value which is greater or less according as the combined bias biasing the driven clutch element into engagement with the driving clutch element is greater or less, and means whereby said driven clutch element is biased out of engagement with said driving clutch element by the force applied thereto by said reaction member and resisted by the said element of the one way brake means.

2. A power transmission mechanism comprising in combination a releasable clutch means having a rotary driving element and a rotary driven element, means for transmitting power through a high speed transmission path upon a clutching engagement of said two clutch elements, means transmitting power through a low speed transmission path upon disengagement of said clutch elements with said driven element at rest, biasing means continually urging said clutch elements toward engagement, centrifugally responsive means coupled with said driven element whereby said centrifugal means is rendered operative by a rotation of said driven element, the centrifugal means, when operational, additionally urging said clutch elements into engagement with a bias increasing and decreasing corresponding to the rotational velocity of the driven element, the said clutch elements, when engaged, being slippable relative to each other in response to a given transmitted torque applied through said high transmission path, the magnitude of said torque being controlled by the magnitude of the combined bias biasing said clutch elements toward engagement, and means coacting with said clutch elements so as to bias the same out of engagement by a force depending upon the torque transmitted through the low speed transmission path.

3. A power transmission mechanism comprising a rotary driving member, a rotary driven member, a gearing connected between said driving member and said driven member for transmitting power from said driving member to said driven member at a step down speed ratio, a rotatable reaction member appertaining to said gearing, one way brake means restraining said reaction member from rotating in one direction, thereby enabling it to act as a reaction member, while permitting it to rotate in the other direction, a clutch having a driving element and a driven element, said driving element being attached to said driving member and said driven element being attached to said reaction member, whereby, when said driving and driven elements are in clutching engagement, direct drive is afforded from said driving member to said driven member, with said gearing, together with said reaction member, rotating en bloc, and, when said driving and driven elements are out of clutching engagement, said gearing is operative and said driven element is at rest, means whereby the torque reaction of said reaction member on said one way brake means biases said driving and driven elements out of clutching engagement, means permanently biasing said driving and driven elements into clutching engagement, and centrifugal means rendered effective by the rotation of said driven element, for additionally biasing said driving and driven elements into clutching engagement, with a bias which is greater or less according as the speed of rotation of said driven element is greater or less, said driving and driven elements, when in clutching engagement being adapted to slip relative to one another, in response to a given torque being applied to the clutch, which torque is greater or less acording as the combined bias biasing said driving and driven elements into clutching engagement is greater or less.

References Cited in the file of this patent

UNITED STATES PATENTS

| | | |
|---|---|---|
| 918,258 | Badois | Apr. 13, 1909 |
| 1,428,659 | Reece | Sept. 12, 1922 |
| 1,909,607 | Blackstock | May 16, 1933 |
| 2,022,058 | Steuber | Nov. 26, 1935 |
| 2,136,971 | Fleischel | Nov. 15, 1938 |
| 2,370,131 | Banker | Feb. 27, 1945 |
| 2,371,564 | Wemp | Mar. 13, 1945 |

OTHER REFERENCES

| | | |
|---|---|---|
| 356,627 | Italy | Feb. 7, 1938 |